United States Patent [19]

Krallinger et al.

[11] 4,005,257
[45] Jan. 25, 1977

[54] FACSIMILE TRANSCEIVER

[75] Inventors: Robert E. Krallinger, New Milford; Vladimir Ignatjev, Norwalk; Ralph K. Rand, New Milford; Matthew Joseph Costello, Bethel, all of Conn.

[73] Assignee: Graphic Sciences, Inc., Danbury, Conn.

[22] Filed: May 5, 1975

[21] Appl. No.: 574,709

[52] U.S. Cl. .............................. 358/256; 358/304; 358/285
[51] Int. Cl.² ......................................... H04N 1/02
[58] Field of Search ......... 178/6, 6.8, 7.1 R, 7.3 R, 178/7.5 R, 7.6 R, 7.9, 6.6, 5

[56] References Cited

UNITED STATES PATENTS

| | | | |
|---|---|---|---|
| 3,180,933 | 4/1965 | Shaler | 178/7.1 |
| 3,445,598 | 5/1969 | Green | 178/6 |

OTHER PUBLICATIONS

Graphic Science Inc., Facsimile Communication Index 4100 Automatic Transceiver.

*Primary Examiner*—Benedict V. Safourek
*Assistant Examiner*—Edward L. Coles
*Attorney, Agent, or Firm*—Robert A. Green

[57] ABSTRACT

A compact facsimile transceiver occupying minimum space includes a straight-line transmitter section and a receiver section disposed beneath a portion of the transmitter. The transmitter transports documents through its scanner section, one by one in essentially a straight line by means of simplified and improved paper-handling apparatus which holds the documents flat. An editor in the transmitter permits segments of the documents being transmitted to be selectively deleted from the transmission. The receiver includes a simple and efficient paper-cutter mechanism and paper-transporting apparatus.

44 Claims, 16 Drawing Figures

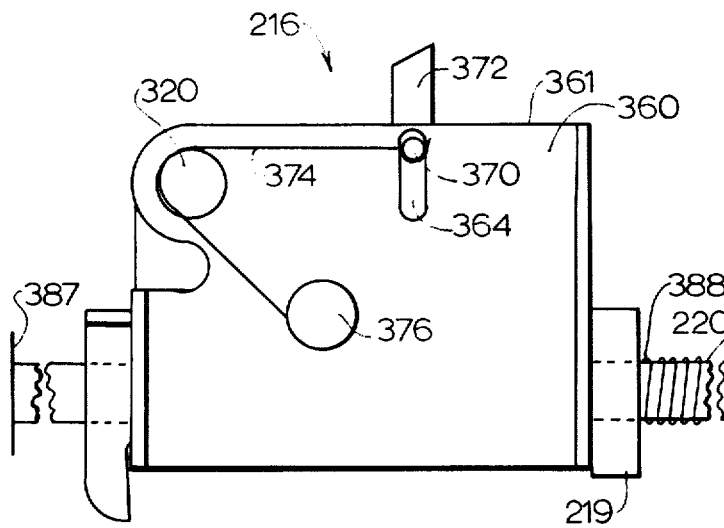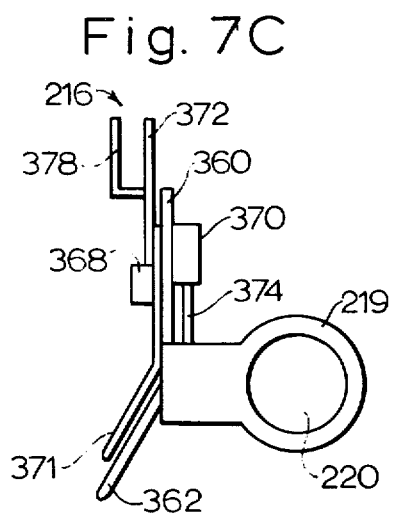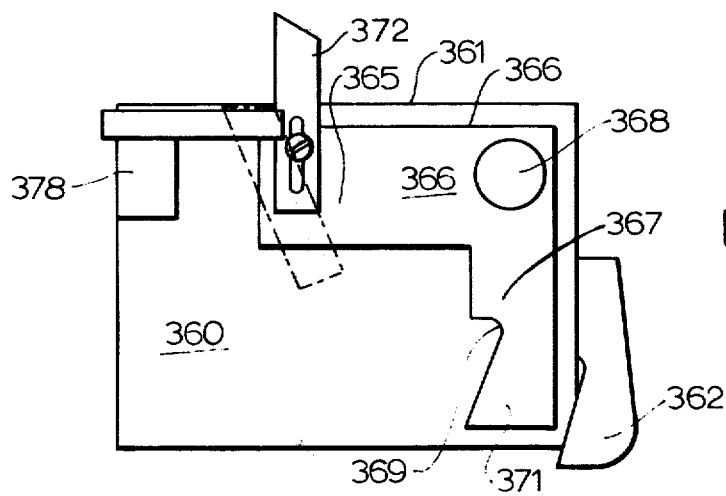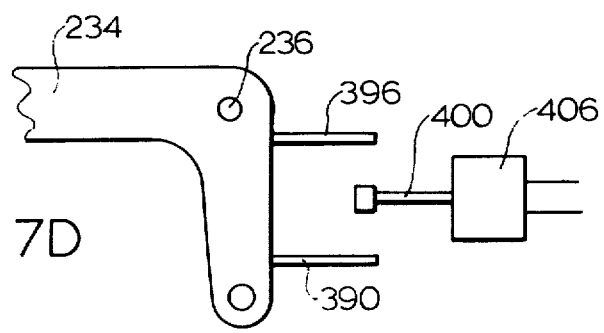

FACSIMILE TRANSCEIVER

BACKGROUND OF THE INVENTION

Facsimile systems typically comprise a transmitter for scanning a document and generating electrical signals indicative of its contents, a remote receiver which receives the signals and reproduces a document in accordance with it, and a communications link, typically a telephone line, interconnecting the two. Frequently the transmitter and receiver and incorporated into a single unit, or transceiver, for convenience. When so combined, of course, each section still performs its separate function, i.e., either transmitting or receiving.

Present transceivers are frequently quite bulky, and thus require a substantial amount of space for their location; such space is not always readily available in a typical office location. In addition, the paper-handling and transporting mechanisms of known transceivers are not as efficient as might be desired. Further, many receivers require the continued presence of an operator when more than one document is to be transmitted, and thus are inefficient.

In present facsimile transmitters, usually the entire document is transmitted, without provision for selective transmission of desired portions. This is a waste of transmission time; further, it prevents the withholding from transmission of confidential portions unless the document is cut or otherwise seriously physically modified prior to placement in the transmitter.

SUMMARY OF THE INVENTION

Briefly, the transceiver of the invention comprises a transmitter and receiver coupled together in a unitary structure which occupies minimal space and is especially suited for crowded office environments. The apparatus transmits and receives documents wholly unattended. The transmitter transports these documents through its scanner section, one by one in essentially a straight line, and it includes means for selecting portions of documents to be deleted from the transmission. The receiver includes a simple and efficient cutter mechanism and improved document-handling and transporting apparatus.

DESCRIPTION OF THE DRAWINGS

FIG. 5-1 is a plan view of the apparatus of FIG. 5 with various modifications therein;

FIG. 7A is a rear view of the cutter assembly of the receiver;

FIG. 7B is a front view of the cutter assembly;

FIG. 7C is a side view of the cutter assembly;

FIG. 7D is a front elevational view of a modification of a portion of the apparatus of FIG. 7.

DESCRIPTION OF THE PREFERRED EMBODIMENTS

Figure 1:
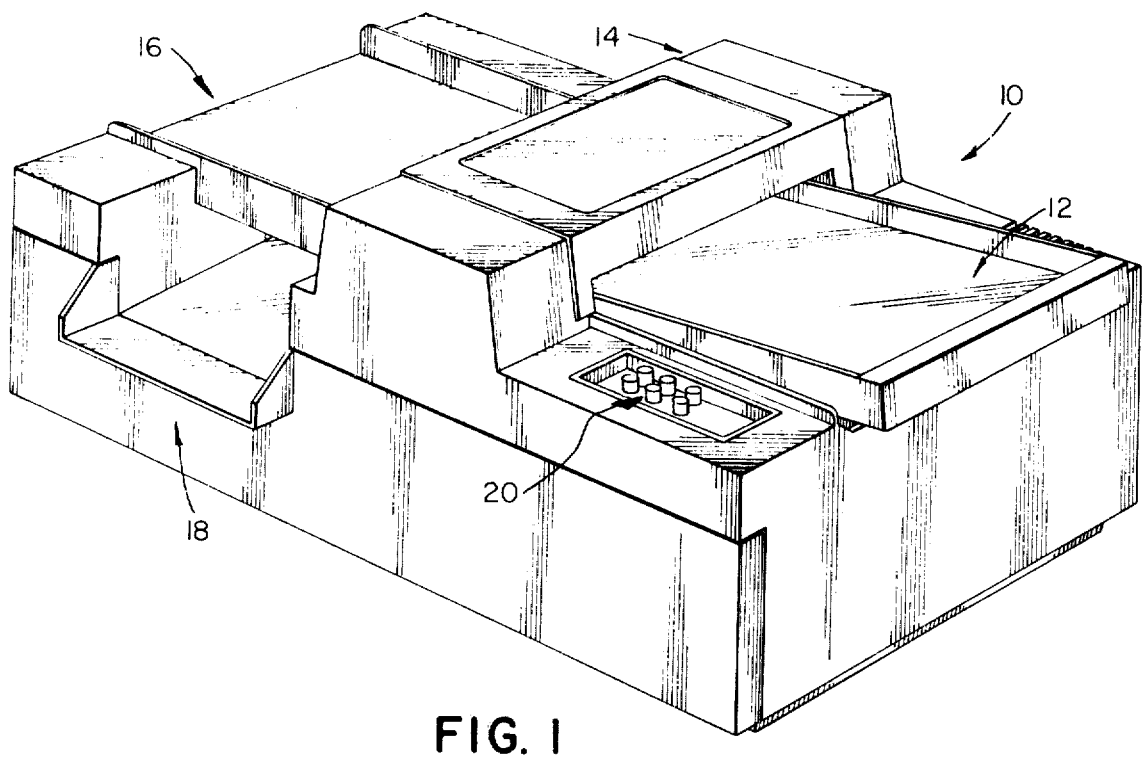
FIG. 1 is a perspective view of a facsimile transceiver embodying the invention.

In FIG. 1, the facsimile transceiver 10 of the present invention comprises a transmitter having a document entrance section formed by a tray 12, a scanner section 14, and a document exit formed by a document-receiving tray 16. Positioned below the tray 16 is a facsimile receiver 18 for reproducing the contents of documents electronically transmitted to it from a remote transmitter. A number of controls 20 are located on the front of the transceiver on the right-hand side thereof (as seen in FIG. 1) for selecting the various modes of operation of the transceiver.

Figure 2:
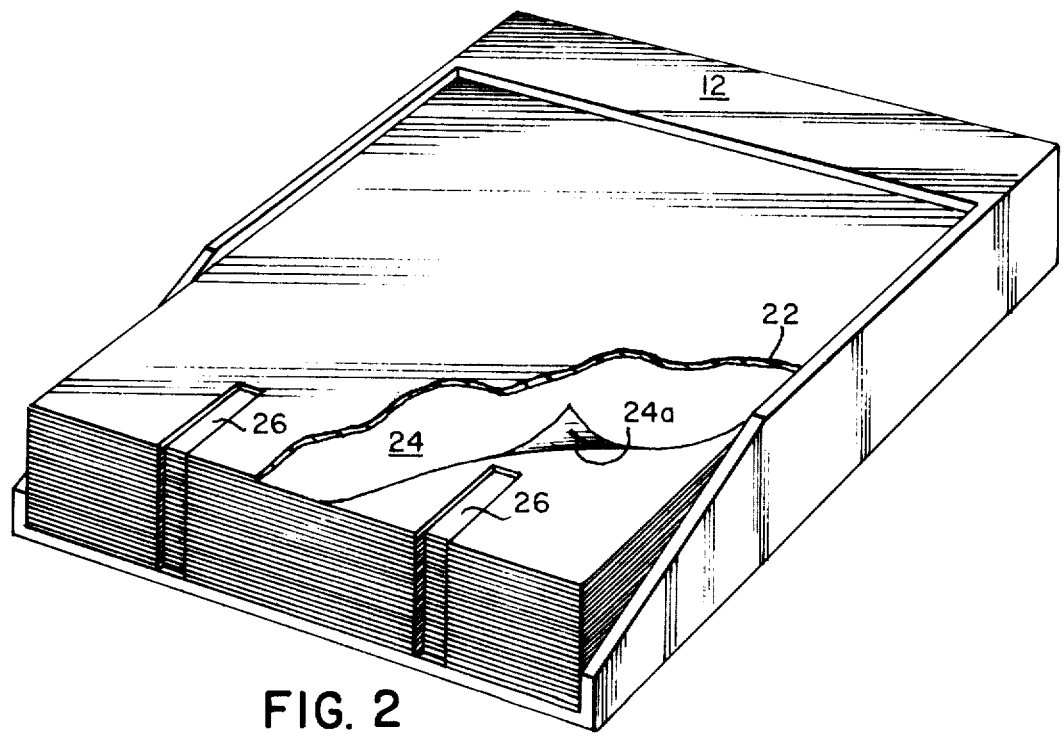
FIG. 2 is a perspective view of a document tray used in the receiver of FIG. 1.

The document tray 12 is shown in more detail in FIG. 2 and comprises a generally rectangular-shaped tray having a number of smooth plastic sheets 22, between which are interposed the documents 24 which are to be transmitted. Each sheet 22 has spaced-apart rectangular slits 26 formed at a forward edge thereof for accommodating a pair of extractor wheels (shown in more detail in FIG. 5) which remove documents from the tray 12. The sheets 22 are bound firmly to the tray at the rear edges thereof, and are not separable therefrom; conversely, the documents 22 are removable from between the sheets 22, as will subsequently be described in detail.

Figure 3:
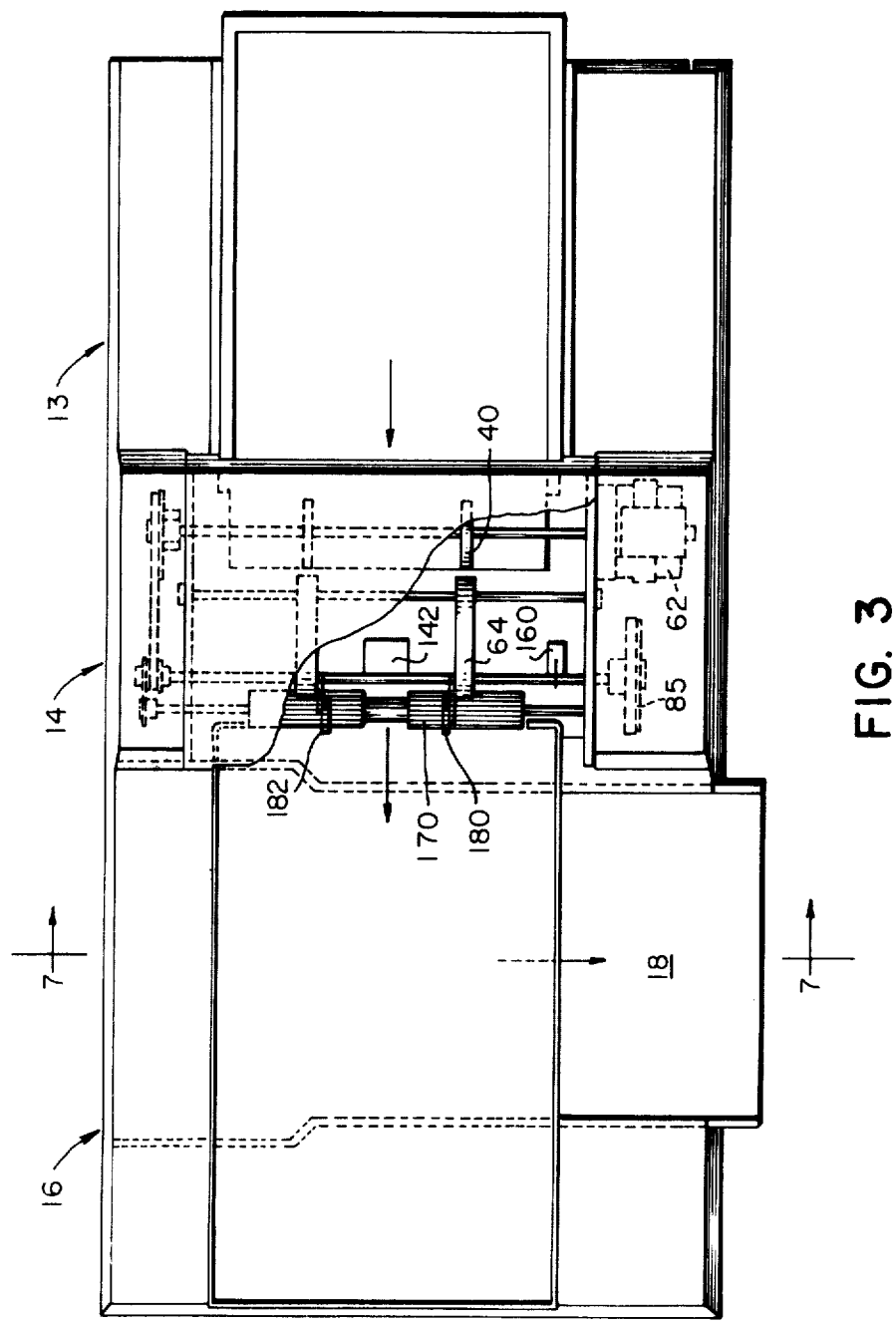
FIGS. 3 and 4 are top plan and front elevational views, respectively, of the transceiver of FIG. 1, with portions broken away for clarity.

As seen from the arrows in FIG. 3, documents to be transmitted to a remote transceiver are transported from the tray 12 through the scanner section 14 into the exit section 16. Thus, the document flow is from right to left in FIG. 3. Conversely, documents which are reproduced in the receiver 18 flow from the rear of the receiver to the front thereof as indicated by the phantom arrow in FIG. 3 and as will be described subsequently in more detail in connection with FIG. 7.

Figure 5:
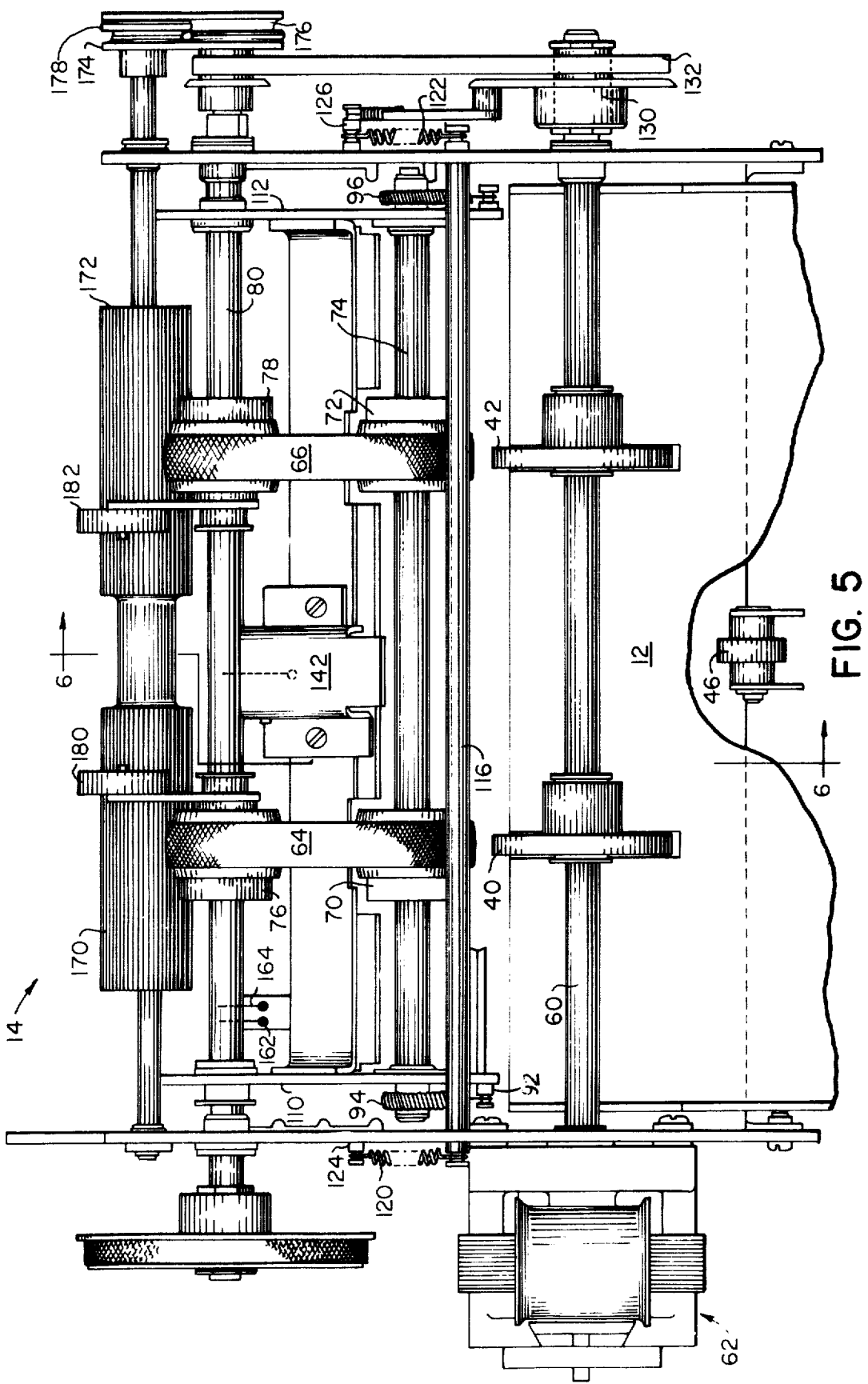
FIG. 5 is an enlarged top plan view of the transmitter scanner section.
Figures 1, 5:
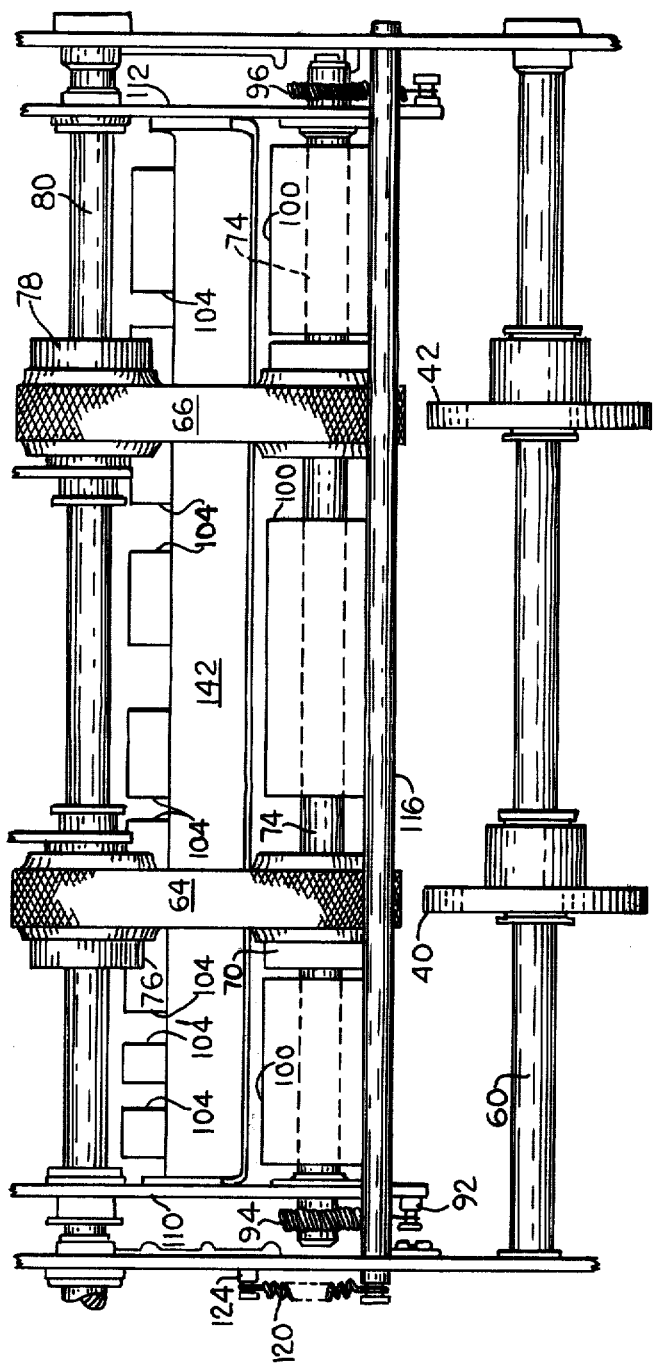
Figure 6A:
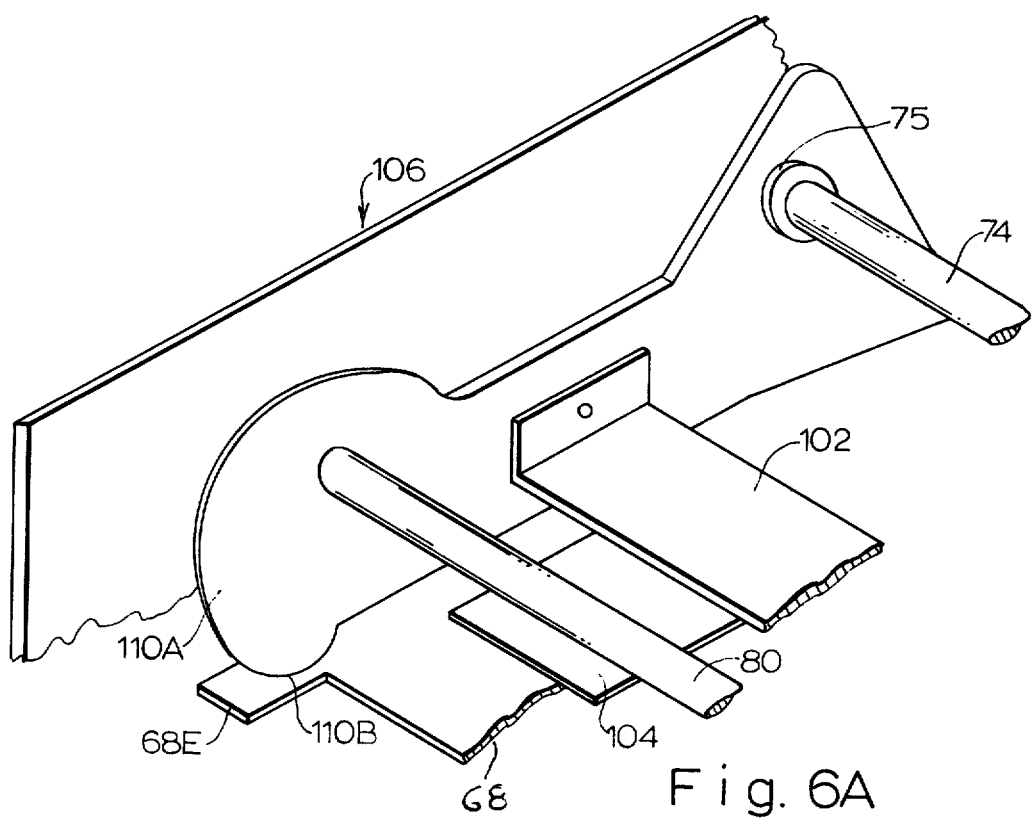
FIG. 6A is a perspective view of a portion of the transmitter apparatus.
Figure 6:
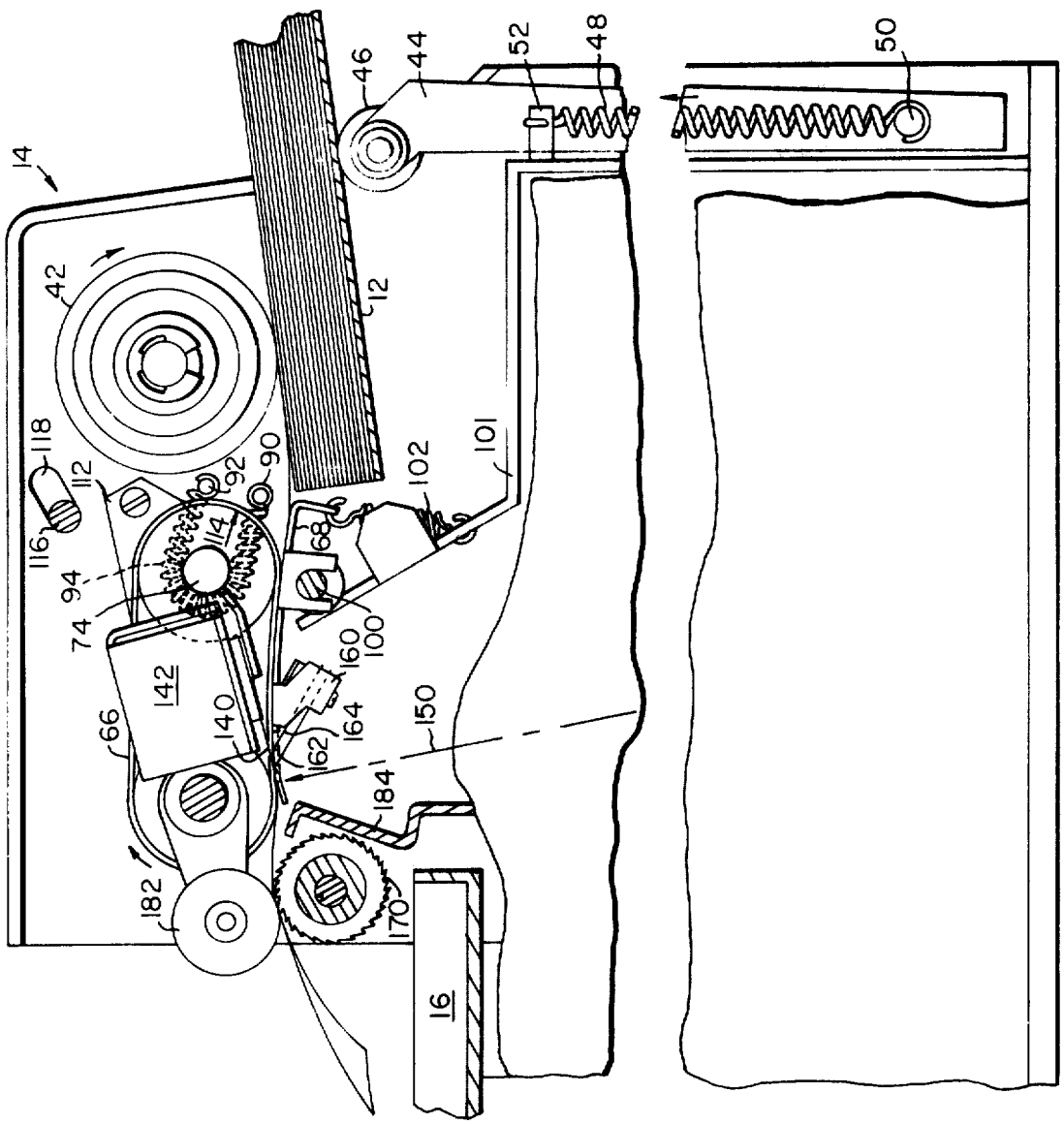
FIG. 6 is a partial sectional view along the lines 6-6 of FIG. 5.

Referring to FIGS. 5 and 6, the document transport and scanner section of the transmitter includes a frame having side walls 30 and 32, which support various portions of the section. As shown in FIG. 6, the tray 12 is urged upwardly against a pair of extractor wheels 40, 42 by means of an arm 44 having a roller 46 pressing against the bottom of the tray. The roller is urged against the tray by means of a spring 48 extending between an attachment 50 on the arm 44 and a pin 52 secured to the frame of the transmitter. The wheels 40, 42 are positioned directly above, and extend down into, the slots 26 (see FIG. 2) of the tray 12 for extracting documents from the tray one at a time. These wheels are connected to a shaft 60, journalled in side walls 30 and 32, which is driven from a motor 62. They rotate in a clockwise direction, as seen in FIG. 6, to feed documents from the tray 12 over horizontal platform 68 toward the nip formed by a pair of roller belts 64 and 66.

Figure 5A:
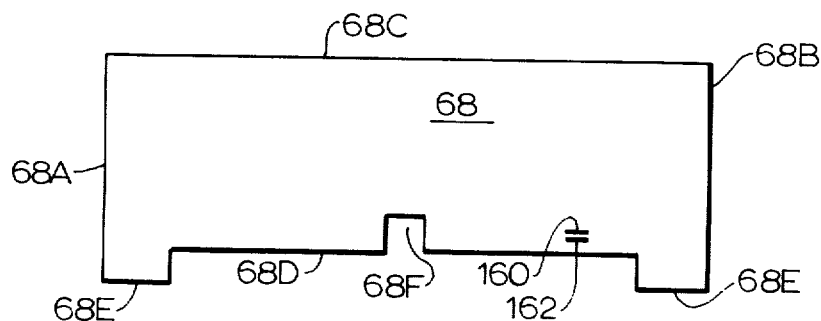
FIG. 5A is a plan view of a portion of the apparatus of FIG. 5.
Figure 5B:
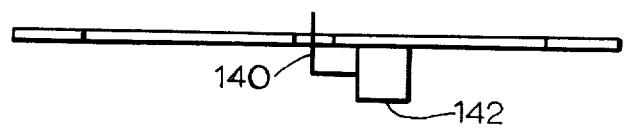
FIG. 5B is a front elevational view of the apparatus of FIG. 5A.

The document-supporting platform 68 shown in FIGS. 5, 5A, and 5B is a sheet of metal having side edges 68A and 68B, a rear edge 68C, and a front edge 68D which includes two projecting arms 68E at the opposite ends thereof and a slot 68F at about its center.

Near the right end, as seen in FIG. 5A, the platform carries two contacts 162 and 164 to be described, and, secured to the lower surface, is a switch 142 having an operating arm 140 which extends through the slot 68F (FIG. 5B).

For operation with the horizontal document-supporting apparatus including the horizontal platform 68, this section (FIGS. 5–7) of the transmitter includes an upper assembly 106 which can be moved into and out of operative relation with platform 68 and serves therewith to hold documents flat and move them along their path from tray 12 to the scanning position and then to the receiving tray. The assembly 106 includes side plates 110 and 112, shafts 74 and 80, rubber rollers 100 mounted on shaft 74, rollers 70 and 72 on shaft 74, rollers 76 and 78 on shaft 80, and roller belts 64 and 66 which run over rollers 70, 76, and 72, 78, respectively. The vertical side plates 110, 112 are rotatably mounted, spaced apart, on shaft 80 (FIG. 5) adjacent to side walls 30 and 32 and above platform 68. Thus, the assembly 106 is rotatable about shaft 80.

The plates 110 and 112 have a generally circular front end 110A and 112A, through which shaft 80 passes, and the lower portion of this circular front end is provided with a protruding and downwardly extending cam surface 110B and 112B which is disposed above platform 68 and in position to bear against arms 68E of platform 68 and to depress platform 68 when the side plates 110 and 112 and the entire assembly 106 is rotated. Rotation of the assembly 106 upwardly is limited by a shaft 116, which slides in slots 118 in side walls 30 and 32 of the transmitter frame. Springs 120, 122 (FIG. 5) extending between the shaft 116 and corresponding pins 124, 126 on the outer surfaces of side walls 30 and 32 hold the shaft 116 in its lowermost position in the slots 118, but allow movement of the shaft 116 upwardly in the slots by an operator to a point where they clear the plates 110 and 112. This allows the assembly 106 and plates 110 and 112 to be swung upwardly about shaft 80 to provide access to the scanner section for inspection and maintenance.

The platform 68 is pivotally mounted on a shaft 100 (FIGS. 6 and 6A) extending across the frame of the transmitter between walls 30 and 32. One end of the platform is urged downwardly by a spring 102 extending between that end and a portion 101 of the frame in order to urge the other end against the belts 64, 66. Thus, when thick documents are encountered between belts 64, 66 and platform 68, the platform can yield to accommodate them.

The assembly 106 also includes a cross plate 102 which extends between the plates 110 and 112 and has its ends secured to these plates. The cross plate is positioned between shafts 74 and 80 and above platform 68, and, at its leading edge, it carries a plurality of thin, flexible metal wiper plates 104, the front edges of which rest on the platform 68 close to the nip between the roller belts 64, 66 and platform 68. One of the wiper plates 104' also presses on contacts 160, 162 so that, when a document is present between the wiper plates 104 and platform 68, the contacts bear on the paper with suitable pressure to perform an editing operation which is described below.

Switch 142 may be mounted on the top surface of plate 102, if desired, as shown in FIG. 5.

The ends of shaft 74 enter enlarged holes 75 in plates 110 and 112, and this arrangement permits shaft 74 to float and adjust to pressure on it due to documents of different sizes which appear between 68 and roller belts 64 and 66. The shaft 74 is coupled to pins 90, 92 on the plates 110 and 112 by means of springs 94, 96. The springs apply tension to the shaft 74 and thus to the belts 64 and 66 which extend between the floating shaft 74 and fixed shaft 80.

A plurality of rubber rollers 100 are disposed on shaft 74, particularly at its ends, to bear on documents, particularly their edges, to prevent them from curling.

Figure 4:
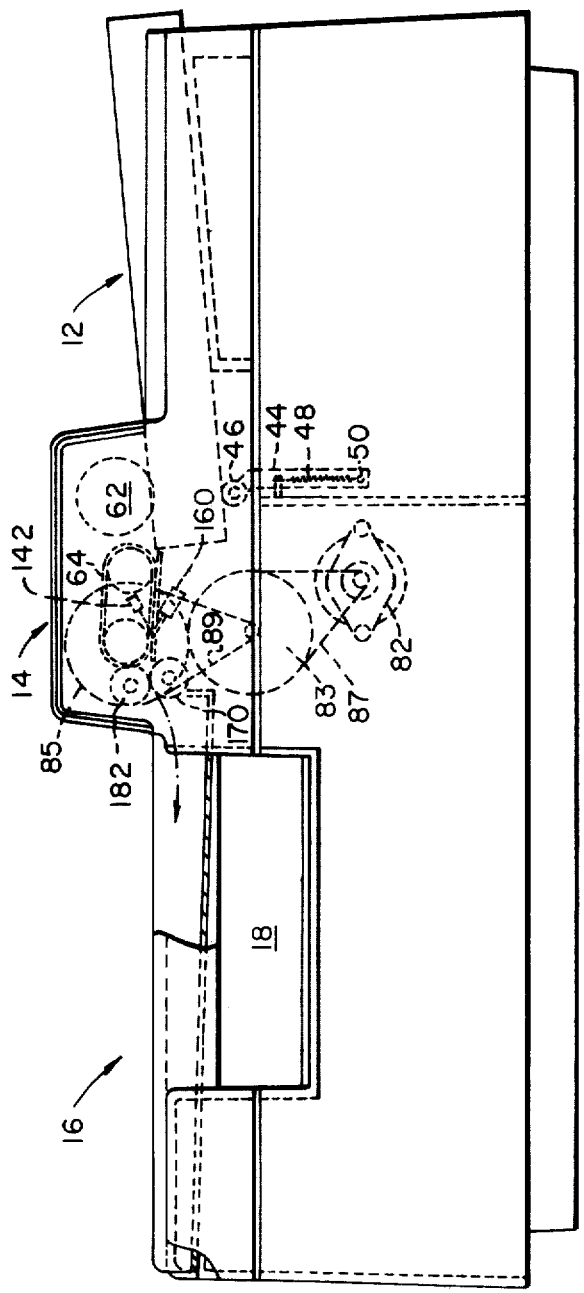

Shaft 80 is driven for rotation in a clockwise direction (FIG. 6) by a belt drive motor 82 (FIG. 4) through pullies 83 and 85 and belts 87 and 89. The shaft 80 is coupled to the shaft 60 by means of a one-way clutch 130 and a driving belt 132 interconnecting the clutch and shaft 80. When motor 62 is energized, motor 82 is de-energized and clutch 130 is engaged. Thus, motor 62 drives shaft 60 directly, and also drives shaft 80 via clutch 130 and belt 132. The connections are arranged so that the extractor wheels 40, 42 move at a peripheral rate less than one-half that of the driving belts 64, 66 to advance a document from the tray 12 into the scanner 14. The principle is that the speed ratio is selected to achieve document separation as the documents are removed from tray 12. A document feeds into the scanner section at this rate until it touches arm 140 of switch 142 which is tripped thereby. When this occurs, it de-energizes motor 62 and disengages clutch 130 to thus stop the initial feed-in; the document is now at the position at which scanning can start.

If this document is the first to be transmitted, the transmitter enters into the "handshake" mode with the remote receiver to indicate its availability for transmission and check on the receiver's availability for reception. (Details of the "handshake" process may be obtained from the U.S. Pat. No. 3,582,550, issued June 1, 1971.) Should the receiver not be available for reception at this time, the transmitter disengages itself from the phone line, and no transmission takes place. However, if both the transmitter and receiver are ready for operation, the transmitter control energizes the driving belt motor 82 (FIG. 4) and simultaneously starts the scanning process.

Scanning is accomplished by projecting a light beam 150 (FIG. 6) onto the document and moving it from side to side, line by line, while observing the intensity of the return beam. This is accomplished by means of an optical scanner described in detail in co-pending U.S. Patent Application Ser. No. 558,415, filed Mar. 14, 1975, by R. W. Rhyins et al. The disclosure of that application is to be considered as incorporated herein.

Positioned within the scanner section 14 are the contacts 160, 162 which are located at the top surface of platform 68 so that they can make contact with the front face (the face on which information is recorded) of the documents being scanned. These contacts are connected into a control circuit and normally form an open circuit within the control circuit. However, on encountering an electrically conductive segment 24a (See FIG. 2) of sufficient length to span the distance between them (preferably, this distance is very short), the circuit between the contacts or leads 160, 162 is closed to thereby create a control signal which energizes the motor 62 to cause document advance at the initial high speed rate.

The document continues its advance through the scanner at this rate until the circuit between the contacts 160, 162 is again broken during transmission of the same document, at which time the slow speed scanning rate is resumed. If the circuit between the contacts 160, 162 is not broken prior to the time that the entire document has passed through the scanner, the high speed rate will continue until a new document is fed into position for scanning.

Positioned at the exit end of the scanner is a serrated roller 170 (FIG. 6) mounted for rotation with a shaft 172 which is driven from shaft 80 by means of pulleys 174, 176 and a resilient line 178. The roller 170 has a serrated surface in the shape of a sawtooth and rotates in a counterclockwise direction (FIG. 6). Pivotally mounted above it are a pair of weighted idler rollers 180, 182. Documents exiting from the belts 64, 66 are guided by an auxiliary platform 184 into the nip between the rollers 170 and 182. As the trailing edge of the documents comes into contact with the roller 170, it is pressed down into a serration by the rollers 182 and is thereby given a thrust outwardly and downwardly by the rear tooth face sufficient to carry the leading edge of the document into the tray 16. This insures that each document clears the scanner section before the next document comes along behind it. Note that this arrangement does not require any rotating parts extending into the tray, and thus provides a compact and efficient design.

Figure 7:
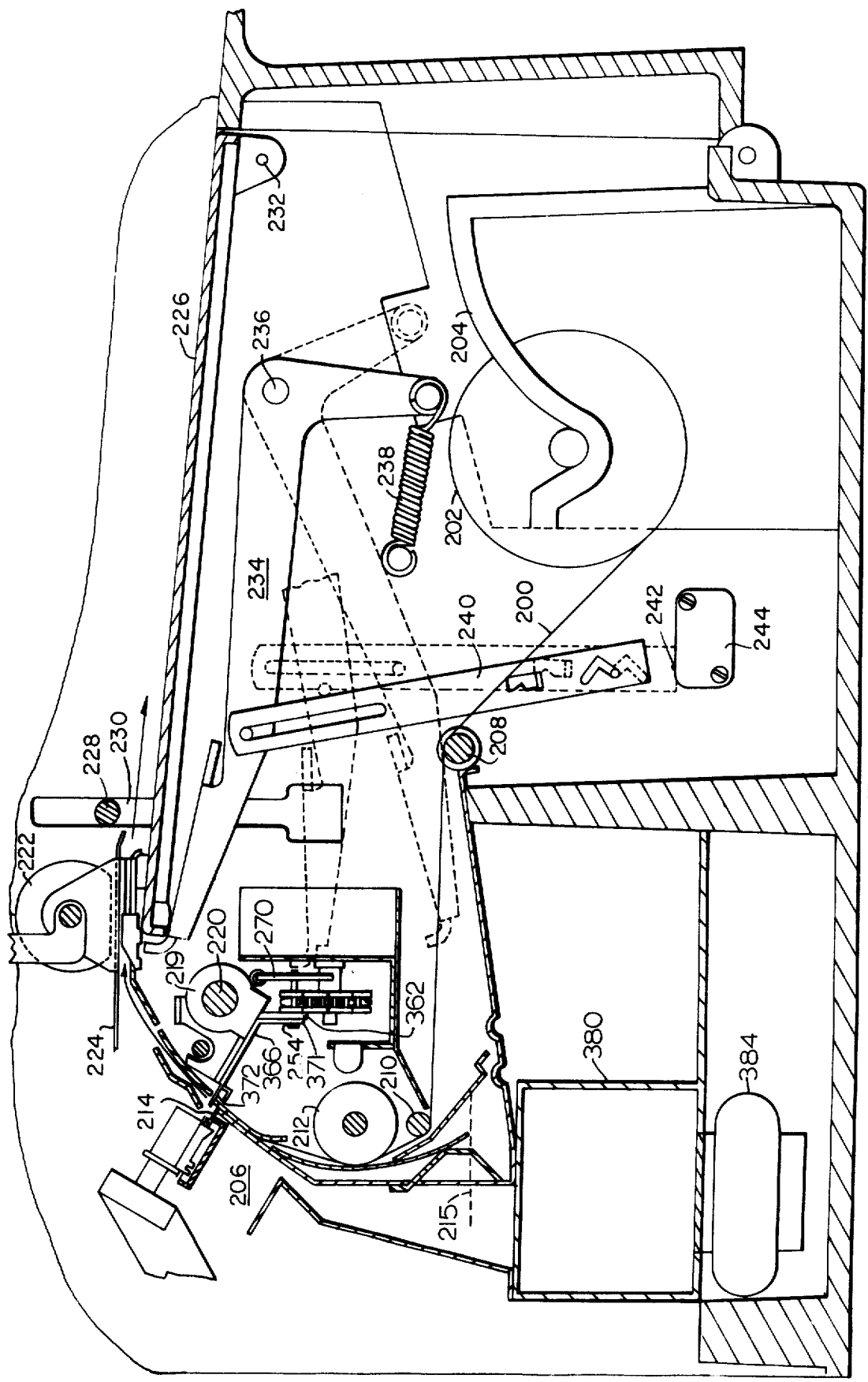
FIG. 7 is a sectional view of the receiver taken along the lines 7—7 of FIG. 3.

Turning now to FIG. 7, portions of the receiver are shown in more detail. Generally, the receiver feeds a continuous web 200 of paper from a roll 202 mounted in a cradle 204 to a writing station 206 over guides 208, 210 and through a roller 212. A spring steel, flexible pressure plate 213 bears against the roller 212 to provide a guide and control action on the web 200, and preferably, an operating handle or the like, represented by dash line 215, is coupled to this plate to permit the plate to be moved away from the roller 212 when the paper is initially fed between the roller and the plate on its way to the cutting station. Preferably, the operating means 215 is accessible to an operator outside the receiver.

A stylus 214 at the writing station is connected to traverse the paper web from side to side and is supplied with electrical signals to reproduce information transmitted to it from the remote transmitter.

A paper cutter assembly 216 is provided and is positioned to serve the paper web at the writing station after a document has been reproduced.

The severed paper is extracted from the writing station by means of extractor wheels 222 which extend downwardly through apertures in frame 224 to contact the reproduced document and feed in onto a platform 226. A bale arm 228 moves downwardly in a slot 230 to pivot the platform about a pivot point 232, simultaneously pressing the document against the platform and assisting in extracting it from the extractor wheels 222. An arm 234 pivoted about a pivot point 236 and loaded by a spring 238 normally supports platform 226 in the elevated position, but allows the platform to move downwardly in response to the motion of the bale 228. An arm 240 moves downwardly toward a contact 242 of a switch 244 whenever arm 243 rotates.

As long as there are fewer than a predetermined number of documents on the platform 226, the lower edge of the arm 240 fails to depress button 242 sufficiently to change the state of the switch 244. When, however, a predetermined number of documents have been loaded onto the platform 226, arm 240 is moved downwardly sufficiently far in response to the motion of arm 234 and bale 228 to operate switch 244. Switch 244 then provides a signal to indicate that the receiver has received the maximum number of documents that it can accommodate and it thereupon shuts down its operation, signalling the remote transmitter that it has done so. No further document will be received after this time.

In an alternative arrangement, represented schematically in FIG. 7D, the rear edge of plate 234 is provided with two rearwardly projecting arms 390 and 396 mounted in operative relation, with the operating arm of a toggle switch suitably supported on the receiver frame. As the plate 234 pivots under the weight of documents, arm 390 operates an arm 400 of switch 406 to turn off the receiver, and then, when documents are removed, the plate 234 pivots in the opposite direction and arm 396 operates arm 400 of the switch to reset the switch and render the receiver operative again.

The paper cutter assembly 216 (FIGS. 7A, 7B, 7C) comprises a generally rectangular plate 360 having an arm 362 extending away from the plate at an angle at the lower right corner, as seen in FIG. 7C. The plate 360 has a generally rectangular vertical slot 364. A pair of guide or bearing rings 219 are secured to the rear surface of plate 360, by means of which the plate and cutter assembly are slidably mounted on shaft 220. The shaft 220 is suitably secured between side walls of the receiver represented schematically by reference numerals 386, 387 in FIG. 7A, and a spring 388 is mounted on shaft 220 between a ring 219 and side wall 386. It is assumed that the cutter assembly moves to the right in FIGS. 7A and 8 to compress spring 388 when it is cocked and prepared for a cutting operation.

A second smaller L-shaped plate 366, having horizontal arm 365 and vertical arm 367, is pivotally coupled to the front surface of the rectangular plate 360 by means of pin 368. The plate 366 carries a pin 370 on its rear surface which is disposed in the slot 364 as a guide slot. The vertical arm 367 of L-shaped plate 366 has a notch 369, for a purpose to be described, and its lower end 371 is bent away from its front surface, as seen in FIG. 7C. Arm 371 lies adjacent to and to the left of arm 362, as seen in FIG. 7B.

A cutting blade 372 oriented with the cutting surface vertical and facing to the left, as seen in FIGS. 7 and 7B, is secured to the L-shaped plate 366, and the plate is pivotally biased, so that the blade is vertical and projects above the upper edge 361 of plate 360, by means of a spring 374 on the rear surface of plate 360. The spring has one arm engaging the pin 370 in the slot 364 and the other arm secured to the plate 360 by means of pin 376. In its second position, shown in dash lines, the plate 366 is pivoted so that the blade 372 is beneath the top surface 361 of the rectangular plate 360. An L-shaped bracket 378 provides a protective slot, into which the blade is held in the second position.

Figure 8:
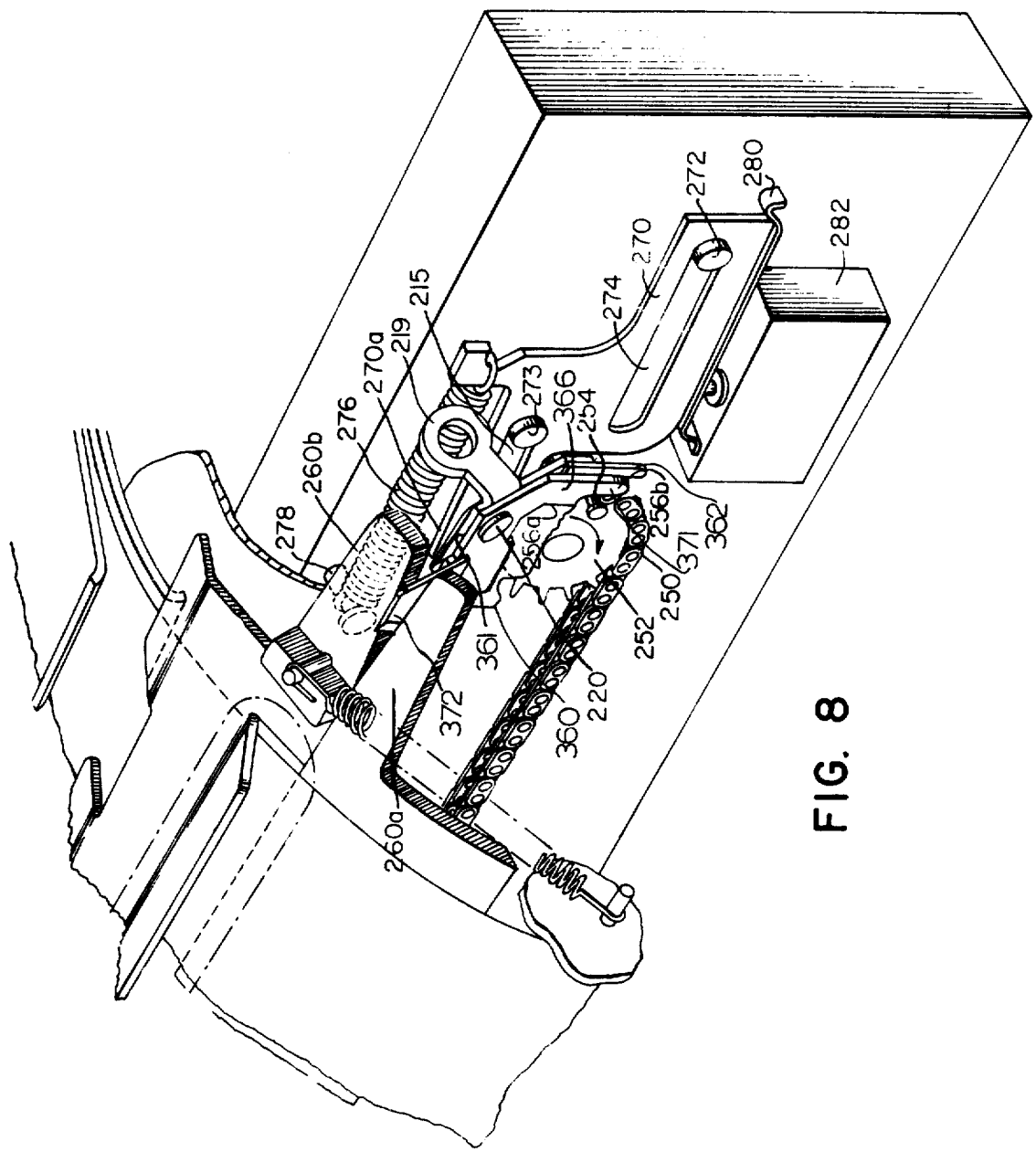
FIG. 8 is a perspective view of a portion of the cutter head.

As seen in FIG. 8, the cutter assembly 216 is mounted so that the projecting arms 371 and 362 of plates 366 and 360 are oriented generally vertically and accessible to apparatus to be described.

Referring to FIGS. 7–8, a drive chain 250, mounted on sprockets 252, (one is shown) carries a pin 254 which moves to the right as the sprocket 252 rotates in the clockwise direction, as shown in FIG. 8 by the arrows. As the pin 254 moves, it engages notch 369 in plate 361 and pivots the cutter blade 216 downwardly so that it lies below top surface 361 of plate 360. This action also drives the cutter assembly to the right to the cocked position, in which spring 388 is compressed and in which it is ready to cut the paper.

Pin 254 on chain 250 also operates a plate 270 positioned adjacent to chain 250 for slidable motion along slots 274, 275 guided by pins 272, 273. A spring 276 connected between the plate 270 and pin 278 on the frame normally biases the plate 270 to its leftmost position, as shown in FIG. 8. However, during the cocking operation, the rearward extension 254A of the pin presses against a face 270a and moves the plate 270 to the right where it slides over an arm 280 of a switch 282. This de-energizes the motor driving the sprockets, stops the chain, and the cutter head is held in cocked position.

On completing reproduction of the next document, the system electronic logic causes the motor which drives sprockets 252 to be energized, and chain 250 moves, and pin 254 starts its downward descent around the sprocket. As it does so, it first becomes disengaged from the plate 366, the plate rotates clockwise, and the blade 372 snaps up under the influence of spring 374, into cutting position oriented vertically, as in FIG. 7A. The pin then disengages from arm 362 of plate 360, and the cutter assembly can fly to the left and cut the paper.

At this time, pin 254 also leaves plate 270 and releases the plate so that it can be pulled to the left and open switch 282. Thus, the motor which drives sprockets 252 is ready for the next cycle of operation.

The receiver also includes a filter 380 which is in the form of a box which comprises a dust collector and air filter, and is disposed generally beneath the paper-cutting portion of the receiver. A suction apparatus 384 is disposed beneath the filter box and is adapted to draw air through the box. The filter box is removable through the front of the receiver portion for cleaning purposes or replacement.

What is claimed is:

1. A facsimile transceiver comprising a transmitter arranged to feed a first document in substantially straight line motion from a document store, through a scanner, into a first receiving tray, and a receiver positioned beneath said first tray and arranged to feed paper on which a document is to be reproduced from a paper store, through a writing head, into a second receiving tray in a direction transverse to the direction in which said first document is fed.

2. A transceiver according to claim 1 in which said first receiving tray forms the top housing for said receiver.

3. A transceiver according to claim 2 which includes means for releasably securing said first tray to said transmitter to thereby provide removal of said tray for access to internal portions of said receiver.

4. A transceiver according to claim 1 in which said transmitter comprises
   A. a document entrance station for receiving documents to be transmitted,
   B. a document exit station for receiving documents that have been transmitted, and
   C. a scanner intermediate said stations and aligned therewith for passage of a document therethrough along a generally straight line between said entrance and exit stations, said scanner scanning the document line by line in a direction transverse to its motion therethrough to thereby generate a signal representative of the contents of the document for transmission to a facsimile receiver.

5. A transceiver according to claim 4 which includes
   1. rapid feed means effective when energized to transport a document from said entrance tray to said scanner
   2. slow feed means effective when energized to transport said document through said scanner for scanning thereby.

6. A transceiver according to claim 5 which includes control means responsive to the position of a document within the scanner to deenergize said rapid feed means and energize said slow feed means when said document reaches a predetermined position within said scanner.

7. A transceiver according to claim 6 which includes means responsive to said control means to exchange synchronizing signals with said receiver when a first document of a group of documents is to be transmitted reaches said predetermined position within said scanner.

8. A transceiver according to claim 6 which includes first and second motor drive means for energizing said rapid feed means and said slow feed means, respectively, and means coupling said fast speed means to said slow speed means for decoupling said fast speed means when said slow speed means is energized.

9. A transceiver according to claim 8 in which said slow means comprises
   1. a first roller pair driven from said second motor means,
   2. a second roller pair,
   3. first and second belts bridging corresponding rollers in said first and second roller pairs, respectively, and
   4. a platform resiliently urged against said belts for supporting a document present between said belts and platform.

10. A transceiver according to claim 1 including editing means responsive to selective markings on a document to advance the marked portions of said document through said scanner at a rate substantially greater than the rate at which it is advanced during a normal transmission and thereby, in effect, not transmitting said marked portions.

11. A transceiver according to claim 10 in which said editing means includes first and second spaced-apart electrical leads positioned for contact with a selected segment of documents fed through said scanner and closing an electrical circuit on contact with conductively marked portions thereof.

12. A transmitter according to claim 1 in which said document entrance station includes
   a tray for storing a plurality of documents for transmission in sequence,
   means for extracting said documents from said tray in sequence, spring means biasing said tray against said extractor means.

13. A transmitter according to claim 1 in which said feed means includes a first longitudinally serrated roller positioned to contact documents exiting from said scanner and a second roller in contact therewith for pressing said documents against said first roller catching the edge of said document in one of its serrations and applying a positive thrust thereto to pass it to said exit station.

14. A transmitter according to claim 13 in which said second roller comprises an idler roller pivotally mounted above said first roller to press a document against said first roller by its own weight.

15. The apparatus defined in claim 1 wherein said transmitter includes document feed means which comprises:
  1. first document advance means for advancing said document at a first rate to first position in said scanner, and
  2. second document advance means for advancing said document through said scanner at a second, slower rate.

16. A transmitter according to claim 15 in which
  1. said first document advance means includes a pair of rotary wheels,
  2. said second document advance means includes first and second belts traveling over corresponding first and second pairs of rotary wheels, and a platform segment adjacent said belts and along which said documents are advanced by motion of said belts, and which includes
  3. a first motor driving said rotary wheels,
  4. a second motor driving said belts, and
  5. clutch means coupling said wheels to said belts for motion therewith when said first motor is energized, and decoupling said wheels from said belts when said second motor is energized.

17. A transmitter according to claim 16 which includes means mounting said platform in cantilever fashion for pressing against said belts whereby said belts frictionally engage documents positioned between themselves and said platform.

18. A transmitter according to claim 16 in which said mounting means comprises means pivotally mounting said platform at one end thereof and spring means connected to said end for urging said platform against belt.

19. A transmitter according to claim 15 which includes control means responsive to the position of the document in said scanner for selectively energizing said first and second document advance means.

20. A transmitter according to claim 19 in which said control means includes a switch having an arm extending therefrom into the path of said document through said scanner and movable to operate said switch on contact with a document in said scanner.

21. A transmitter according to claim 20 which includes
  means positioning said switch arm within said scanner for actuation by a document when said document reaches a position at which it is to be scanned,
  means responsive to said switch prior to actuation to energize said first document advance means, and
  means responsive to said switch subsequent to said actuation to energize said second document advance means and de-energize said first document advance means.

22. A transmitter according to claim 21 which includes control override means for advancing said document through said scanner at a rate greater than said second rate.

23. A transmitter according to claim 1 which includes editing means responsive to a marked section of a document to suppress transmission of said marked section to said receiver.

24. A transmitter according to claim 23 in which said editing means includes first and second electrical leads positioned to contact said document as it passes through said scanner and responsive to selectively positioned electrically conductive marks on said document to complete a circuit between said leads and thereby provide an editing signal for suppressing transmission of the marked portion of said document.

25. A transmitter according to claim 24 in which said feed means is responsive to said editing signal to advance said document through said scanner at a rate faster than the rate at which it advances the document for scanning.

26. In a facsimile receiver having means feeding a continuous sheet of paper for reproduction of documents thereon, a cutter head for cutting the sheet to selected sizes, spring means for driving the cutter across said sheet, and a motor driven chain extending over a pair of sprockets and carrying a pin for engaging said head and returning it to a starting position, said pin releasing said head on passing around one of said sprockets, the improvement comprising
  A. a switch connected to remove driving current from said motor when actuated to thereby halt movement of said chain, and
  B. an arm positioned for contact with said pin and movement therewith when said pin returns to said one sprocket, said arm actuating said switch to deenergize said motor prior to disengagement of said pin with said head.

27. A facsimile receiver including
  means feeding a continuous sheet of paper for reproduction of documents thereon,
  roller means guiding said paper,
  a flexible plate bearing against a portion of said roller means for assisting the passage of said sheet of paper,
  means for separating said flexible plate and said portion of said roller means from each other to provide a space into which said paper can be fed,
  a cutter head for cutting the sheet to selected sizes,
  drive means for driving the cutter across said sheet, and
  means coupled to said drive means for cocking said cutter and preparing it for a cutting operation.

28. The receiver defined in claim 27 and including a filter and suction means disposed beneath said sheet of paper in the vicinity of said cutter.

29. A facsimile receiver including
  a printing station and a cutting station,
  means feeding a continuous sheet of paper for reproduction of documents thereon at said printing station,
  roller means for guiding said paper from said printing station to said cutting station, and
  paper cutting means at said cutting station comprising
  a first fixed plate having a first projecting tab and having a slot,
  a second plate pivotally coupled to said first plate and having a second projecting tab,
  said first and second being disposed adjacent to each other,
  a pin secured to said second plate and slidably disposed in said slot,
  a cutting blade secured to said second plate and pivotable therewith into and out of cutting position, and
  means secured to said first plate slidably mounting said first plate and said cutting means on a shaft on which said cutting means can be moved into and out of cutting relationship with said sheet of paper.

30. The apparatus defined in claim 29 and including a sprocket and chain combination whereby the chain can be driven along a predetermined path, a spring on said shaft, a pin carried by said chain and adapted to move with said chain to first engage said second projecting tab to slide said cutting assembly on said shaft in a first direction away from said sheet of paper and simultaneously to pivot said second plate and said cutting blade out of cutting position and simultaneously compressing said spring, continued movement of said chain causing said pin to disengage from said second projecting tab whereby said cutting blade moves into cutting position, said pin simultaneously engaging said first projecting tab, continued movement of said chain causing said pin to disengage from said first projecting tab and thus freeing said cutting assembly to move toward said paper under the influence of said spring and to perform a cutting operation.

31. Document transporting apparatus comprising a tray supporting a plurality of documents and having a front end, first means adjacent to the front end of said tray for extracting one document at a time from said tray, a generally horizontal support plate disposed adjacent to said first means to receive said documents, and roller means in operative relation with said support plate for grasping and transporting said documents along a path between said roller means and said support plate, said roller means being pivotally mounted with respect to said horizontal plate so that it can move toward and away from said horizontal plate to accommodate documents of different thicknesses.

32. The apparatus defined in claim 31 wherein said roller means is mounted between a pair of side plates, and a cam surface is provided on said side plates for bearing against said horizontal plate, when said roller means is pivoted, to force said horizontal plate away from said roller means.

33. A flat bed facsimile transmitter comprising

A. means forming a document entrance station for receiving documents to be transmitted, B. a scanner for scanning each document and generating electrical signals indicative of the contents thereof for transmission to a receiver, C. feed means positioned to remove from the entrance station and advance them through said scanner in substantially straight-line motion, said feed means including 1. first document advance means, including a pair of rotary wheels, for advancing said document at a first rate to a first position in said scanner, 2. second document advance means for advancing said document through said scanner at a second, slower rate, and including first and second belts traveling over corresponding first and second pairs of rotary wheels, and a platform segment adjacent said belts and along which said documents are advanced by motion of said belts, 3. a first motor driving said rotary wheels, 4. a second motor driving said belts, 5. clutch means coupling said wheels to said belts for motion therewith when said first motor is energized, and decoupling said wheels from said belts when said second motor is energized, and 6. means mounting said platform in cantilever fashion for pressing against said belts whereby said belts frictionally engage documents positioned between themselves and said platform, and D. means forming a document exit station for receiving documents exiting from said scanner.

34. A transmitter according to claim 33 in which said mounting means comprises means pivotally mounting said platform at one end thereof and spring means connected to said end for urging said platform against said belts.

35. A transmitter according to claim 33 in which said feed means includes a first longitudinally serrated roller positioned to contact documents exiting from said scanner and a second roller in contact therewith for pressing said documents against said first roller catching the edge of said document in one of its serrations and applying a positive thrust thereto to pass it to said exit station.

36. A transmitter according to claim 35 in which said second roller comprises an idler roller pivotally mounted above said first roller to press a document against said first roller by its own weight.

37. A transmitter according to claim 33 which includes control means responsive to the position of the document in said scanner for selectively energizing said first and second document advance means.

38. A transmitter according to claim 37 in which said control means includes a switch having an arm extending therefrom into the path of said document through said scanner and movable to operate said switch on contact with a document in said scanner.

39. A transmitter according to claim 38 which includes

A. means positioning said switch arm within said scanner for actuation by a document when said document reaches a position at which it is to be scanned, B. means responsive to said switch prior to actuation to energize said first document advance means, C. means responsive to said switch subsequent to said actuation to energize said second document advance means and deenergize said first document advance means, 40. A transmitter according to claim 39 which includes control override means for advancing said document through said scanner at a rate greater than said second rate.

41. A transmitter according to claim 33 in which said document entrance station includes 1. a tray for storing a plurality of documents for transmission in sequence, 2. means for extracting said documents from said tray in sequence, 3. spring means biasing said tray against said extractor means.

42. A transmitter according to claim 33 which includes editing means responsive to a marked section of a document to suppress transmission of said marked section to said receiver.

43. A transmitter according to claim 42 in which said editing means includes first and second electrical leads positioned to contact said document as it passes through said scanner and responsive to selectively positioned electrically conductive marks on said document to complete a circuit between said leads and thereby provide an editing signal for suppressing transmission of the marked portion of said document.

44. A transmitter according to claim 43 in which said feed means is responsive to said editing signal to advance said document through said scanner at a rate faster than the rate at which it advances the document for scanning.

* * * * *

UNITED STATES PATENT OFFICE
CERTIFICATE OF CORRECTION

PATENT NO. : 4,005,257
DATED : January 25, 1977
INVENTOR(S) : Robert E. Krallinger, Vladimir Ignatjev, Ralph K. Rand, Matthew Joseph Costello It is certified that error appears in the above-identified patent and that said Letters Patent are hereby corrected as shown below:

Column 5, Line 45, change "serve" to --sever--

Column 9, Line 33, after "against" insert --said--

Column 9, Line 34, change "belt" to --belts--

Column 10, Line 57, after "second" insert --tabs--

Signed and Sealed this

Seventeenth Day of May 1977

[SEAL]

Attest:

RUTH C. MASON
Attesting Officer

C. MARSHALL DANN
Commissioner of Patents and Trademarks